(12) United States Patent
Jeong (10) Patent No.: US 9,031,115 B2
(45) Date of Patent: May 12, 2015

(54) APPARATUS AND METHOD FOR MEMORY RESOURCE ALLOCATION BASED ON VIRTUAL MINIMUM SPREADING FACTOR

(71) Applicant: QUALCOMM Incorporated, San Diego, CA (US)

(72) Inventor: Yeon Kyoon Jeong, Lafayette, CO (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/108,302

(22) Filed: Dec. 16, 2013

(65) Prior Publication Data

US 2014/0219317 A1    Aug. 7, 2014

Related U.S. Application Data

(60) Provisional application No. 61/759,863, filed on Feb. 1, 2013.

(51) Int. Cl.
| | | |
|---|---|---|
| H04B 1/00 | (2006.01) | |
| H04B 1/69 | (2011.01) | |
| H04L 5/00 | (2006.01) | |
| H04W 52/16 | (2009.01) | |
| H04B 1/707 | (2011.01) | |
| H04J 13/00 | (2011.01) | |

(52) U.S. Cl.
CPC ............ *H04B 1/69* (2013.01); *H04L 5/0048* (2013.01); *H04B 1/707* (2013.01); *H04J 13/00* (2013.01); *H04W 52/16* (2013.01)

(58) Field of Classification Search
CPC ........................................................ H04B 1/69
See application file for complete search history.

(56) References Cited

U.S. PATENT DOCUMENTS

| | | | |
|---|---|---|---|
| 7,092,720 B2* | 8/2006 | Stern-Berkowitz et al. | 455/453 |
| 7,903,618 B2* | 3/2011 | Cho et al. | 370/335 |

(Continued)

FOREIGN PATENT DOCUMENTS

EP    1758318 A2    2/2007

OTHER PUBLICATIONS

3GPP:"3rd Generation Partnership Project; Technical Specification Group Radio Access Network (Release 8)"; Feasibility on Synchonised E-DCH for UTRA FDD; TS 25.823, vol. 8.0.0 (Mar. 2008).

(Continued)

*Primary Examiner* — Santiago Garcia
(74) *Attorney, Agent, or Firm* — Novak Druce Connolly Bove + Quigg LLP (57) ABSTRACT

Methods for improving memory resource allocation at a base station of a wireless communications system, based on a virtual minimum spreading factor, may include computing a maximum traffic-to-pilot (T2P) power ratio for a UE, and sending a grant message to the UE specifying the maximum T2P power ratio. The base station may determine a largest minimum spreading factor (SF) for the UE based on the computed maximum T2P power ratio. The base station may allocate a memory buffer for storing minimum SF signal samples, receive one or more spread spectrum signals from the UE, and partially despread the received signals using the largest minimum SF, thereby preparing partially despread signal samples in the memory buffer. The base station may receive, from the UE, information about the actual SF used by the UE, and despread the partially despread signal samples stored in the memory buffer using the actual SF.

22 Claims, 10 Drawing Sheets

(56) References Cited

U.S. PATENT DOCUMENTS

| | | |
|---|---|---|
| 8,000,284 B2 | 8/2011 | Lott et al. |
| 2002/0136278 A1 | 9/2002 | Nakamura et al. |
| 2003/0224798 A1* | 12/2003 | Willenegger et al. ......... 455/450 |
| 2005/0226140 A1* | 10/2005 | Zhuang et al. ................ 370/203 |
| 2008/0194286 A1* | 8/2008 | Chen et al. .................... 455/522 |
| 2012/0113834 A1* | 5/2012 | Hunzinger ..................... 370/252 |
| 2012/0320746 A1* | 12/2012 | Nadas et al. ................... 370/230 |

OTHER PUBLICATIONS

International Search Report and Written Opinion—PCT/US2014/013964—ISA/EPO—Jul. 14, 2014.

* cited by examiner

| Absolute Grant Index | Maximum E-DPDCH to DPCCH power ratio the UE is allowed to use [dB] | Maximum Data Rate | Minimum SF |
|---|---|---|---|
| 31 | 28.8 | 5742 kbps | sf4x2-and-sf2x2 |
| 30 | 27.8 | 5742 kbps | sf4x2-and-sf2x2 |
| 29 | 27.0 | 5742 kbps | sf4x2-and-sf2x2 |
| 28 | 26.0 | 5742 kbps | sf4x2-and-sf2x2 |
| 27 | 25.0 | 5742 kbps | sf4x2-and-sf2x2 |
| 26 | 24.0 | 5742 kbps | sf4x2-and-sf2x2 |
| 25 | 23.0 | 4791 kbps | sf4x2-and-sf2x2 |
| 24 | 22.1 | 3855.5 kbps | sf4x2-and-sf2x2 |
| 23 | 21.0 | 2992.5 kbps | sf4x2-and-sf2x2 |
| 22 | 20.0 | 2408 kbps | sf2x2 |
| 21 | 19.0 | 1938 kbps | sf2x2 |
| 20 | 18.0 | 1504 kbps | sf2x2 |
| 19 | 17.0 | 1210.5 kbps | sf4x2 |
| 18 | 16.0 | 974 kbps | sf4x2 |
| 17 | 15.0 | 756 kbps | sf4x2 |
| 16 | 14.0 | 608.5 kbps | sf4 |
| 15 | 13.0 | 489.5 kbps | sf4 |
| 14 | 12.0 | 394 kbps | sf4 |
| 13 | 11.0 | 305.5 kbps | sf4 |
| 12 | 9.9 | 237 kbps | sf4 |
| 11 | 8.9 | 191 kbps | sf4 |
| 10 | 8.1 | 159 kbps | sf4 |
| 9 | 7.1 | 123.5 kbps | sf8 |
| 8 | 6.0 | 96 kbps | sf8 |
| 7 | 5.1 | 80 kbps | sf8 |
| 6 | 4.1 | 64.5 kbps | sf16 |
| 5 | 2.1 | 9 kbps | sf32 |
| 4 | 0 | 9 kbps | sf32 |
| 3 | -2.7 | 9 kbps | sf32 |
| 2 | -6.6 | 0 | N/A |
| 1 (ZERO_GRANT) | N/A | 0 | N/A |
| 0 (INACTIVE) | N/A | 0 | N/A |

APPARATUS AND METHOD FOR MEMORY RESOURCE ALLOCATION BASED ON VIRTUAL MINIMUM SPREADING FACTOR

CROSS-REFERENCE TO RELATED APPLICATION

This application claims priority pursuant to 35 U.S.C. §119 (e) to U.S. provisional application Ser. No. 61/759,863 filed Feb. 1, 2013, which is hereby incorporated by reference, in its entirety

BACKGROUND

Aspects of the present disclosure relate generally to wireless communication systems, and more particularly, to an apparatus and method for improving memory resource allocation at a base station.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Uplink Packet Access (HSUPA) is a data service offered on the uplink of UMTS networks.

In UMTS and other CDMA-based systems, "despreading" refers to processing radio signals over a radio spectrum to recover the information that has been spread or distributed over the spectrum by a transmitter using, for example, one of the CDMA-based technologies referenced above. In such systems, a base station (BS) cannot fully despread a received signal from the User Equipment (UE) until the actual spreading factor (SF) used by the UE to generate the transmitted signal is decoded from an uplink control channel, such as, for example, the Enhanced Dedicated Physical Control Channel (E-DPCCH). The BS can partially despread the received signals using a minimum SF specified by the UMTS standard and store these signal samples in a memory buffer, while it waits for the actual SF information from the UE, so it can correctly despread the signal samples. However, as the minimum SF selected by the BS to partially despread received signals is lowered, the number of signal samples that the BS has to store in its memory is correspondingly increased. This negative correlation may result in inefficient use of limited memory resources at the BS.

SUMMARY

Methods, apparatus and systems for improving memory resource allocation at a base station of a wireless communications system, based on a virtual minimum spreading factor, are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for wireless communication by a base station may include computing a maximum traffic-to-pilot (T2P) power ratio for a UE, and sending a grant message to the UE specifying the maximum T2P power ratio. The maximum T2P power ratio may be expressed, for example, as a ratio of E-DPDCH power to Dedicated Physical Control Channel (DPCCH) power. The method may further include determining a largest minimum spreading factor (SF) for the UE based on the computed maximum T2P power ratio. Determining the largest minimum SF for the UE based on the computed maximum T2P power ratio may include determining a maximum data rate associated with (for example, enabled by) the maximum T2P power ratio, and determining the largest minimum SF associated with (for example, enabled by) the maximum data rate. In an alternative, or in addition, the determining the largest minimum SF for the UE based on the computed maximum T2P power ratio may include using a look-up table that specifies corresponding maximum T2P power ratio, maximum data rate and minimum SF.

In another aspect, the method for wireless communication may include allocating a memory buffer for storing minimum SF signal samples, receiving one or more spread spectrum signals from the UE, and partially despreading the received signals using the largest minimum SF. The spread spectrum signals may comprise signal spread using Orthogonal Variable Spreading Factor (OVSF) codes. The method may further include storing the partially despread signal samples in the memory buffer. The method may further include receiving from the UE information about the actual SF used by the UE, and despreading the signal samples stored in the memory buffer using the actual SF.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a mobile entity, for example a mobile entity or access terminal. In other embodiments, aspects of the technology may be implemented in a network entity, such as, for example, a base station, eNB, picocell, femtocell or Home Node B. In some aspects, a mobile entity and network entity may operate interactively to perform aspects of the technology as described herein. Similarly, an article of manufacture may be provided, including a computer-readable storage medium holding encoded instructions, which when executed by a processor, cause a network entity or access terminal to perform the methods and aspects of the methods as summarized above.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
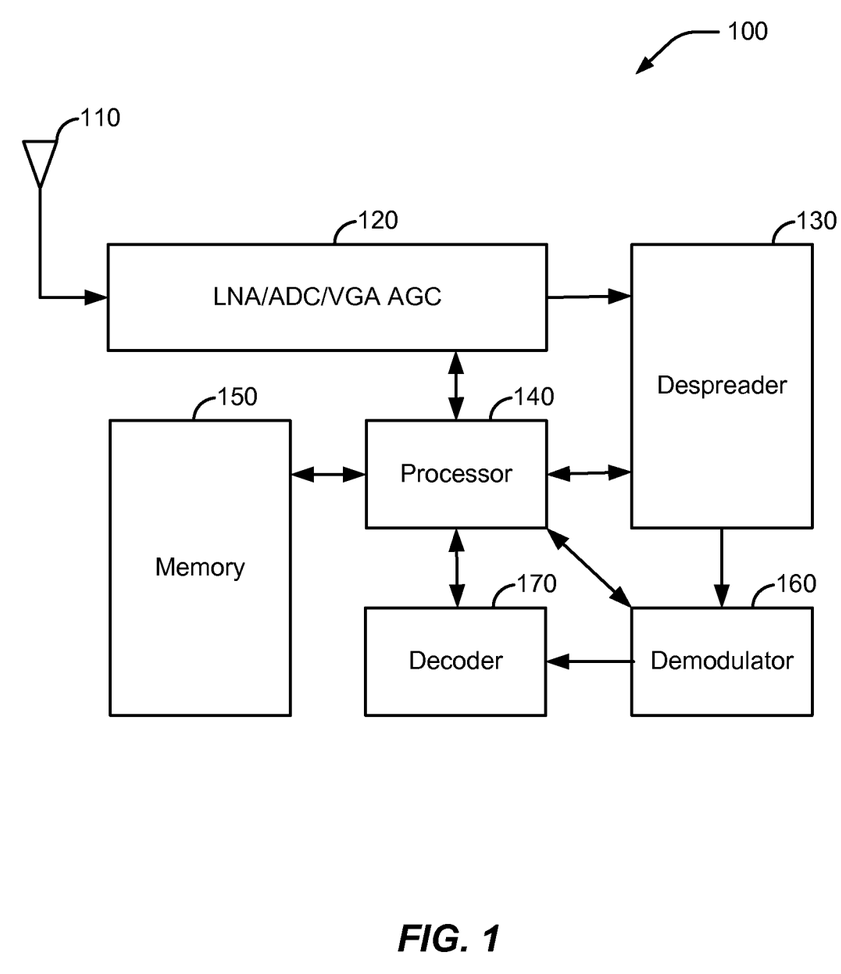
FIG. 1 is a block diagram that illustrates one example implementation of a base station.

FIG. 1 illustrates an example configuration of a base station (BS) 100, e.g., NodeB. BS 100 includes a radio frequency (RF) antenna 110 that receives RF signals, such as WCDMA voice or data packets, from UEs and transforms them into electromagnetic signals. The signals are transmitted to the amplifier circuit 120, which may include a low noise amplifier (LNA), analog-to-digital converter (ADC), variable gain amplifier (VGA) and automatic gain control (AGC) circuit, which calibrates operating range of the LNA, ADC and VGA. The amplified and digitized signals are then passed to a de spreader 130, which despreads the CDMA signals, as will be explained in greater detail below. The despreaded signal is demodulated by a demodulator 160, such as a QPSK or QAM demodulator, equalizer, or multi-user/code detector. The demodulated signal is passed to decoder 170, such as Viterbi decoder, which performs decoding and error correction of the convolutionally encoded data. In one aspect, the despreader 130, demodulator 160 and decoder 170 may be implemented using one or more Digital Signal Processors (DSPs). The BS 100 also includes a processor 140, such as a microprocessor, microcontroller, which executes programs for controlling operation of the components of the BS, and memory 150 that stores data and programs executed by the processor 140.

In CDMA-based systems, such as UMTS, transmitted signals are spread over a wide frequency spectrum using orthogonal spreading sequences, which allows multiple UEs to transmit on the same band of frequencies. The spreading of signals typically is performed using sets of orthogonal spreading sequences (also known as spreading codes). Commonly used spreading schemes uses Walsh codes, Hadamard codes, or orthogonal variable spreading factor (OVSF) codes. In OVSF coding as used in 3G UMTS systems, different spreading codes are derived from an OVSF code tree. Different OVSF codes may have different spreading factors (SF), sometimes referred to as 1, 2, 4, 8, 16, 32, 64, 128 and 256 chips, or other terminology. The despreader 130 of the BS 100 performs despreading of the received signals from UEs by mapping the received signals based on the corresponding SF and the code index, which uniquely identify the spreading code. UEs may use different SF for different types of transmissions requiring different data rates (e.g., data, voice, streaming, etc.). Information about SF used for each transmission is typically sent by the UE to the BS 100 in the uplink control channel (e.g., E-DPCCH channel).

As briefly explained in the background, BS 100 cannot fully despread the received signal from a UE until SF information is decoded from the uplink control channel. In some CDMA-based systems, such as UMTS, the BS 100 may partially despread the signal by using the minimum SF specified by the standard. For example, when the UE is signaled to use one physical channel with SF of 16 as a minimum SF, the BS 100 knows that the actual SF will be equal to or larger than 16. Then, BS 100 may accumulate in a memory buffer 16 chips of received signal until the actual number of chip accumulation, i.e., the SF ($>=16$), is known to it and the despreading of the accumulated samples can be performed by despreader 130. The number of 16 chip accumulated samples is 480 in a subframe, while the maximum data rate available with a SF of 16 may be 168 kbps. When the UE is signaled to use SF of 4 as minimum SF, the number of minimum SF accumulated samples is 1,920, while the maximum data rate available with this minimum SF of 4 may be 713 kbps. Furthermore, when the UE is signaled to use 4 physical channels as minimum SF, two with SF of 2 and the other two with SF of 4 (e.g., sf4×2-and-sf2×2), the number of minimum SF accumulated samples is 11,520, while the maximum data rate available with this minimum SF may be 5.76 Mbps. Therefore, there is a tradeoff between the memory requirement and the maximum achievable data rate. The maximum data rates used in the above examples are merely for purpose of example, and they can differ depending on the configuration of the communication system.

Figure 2:
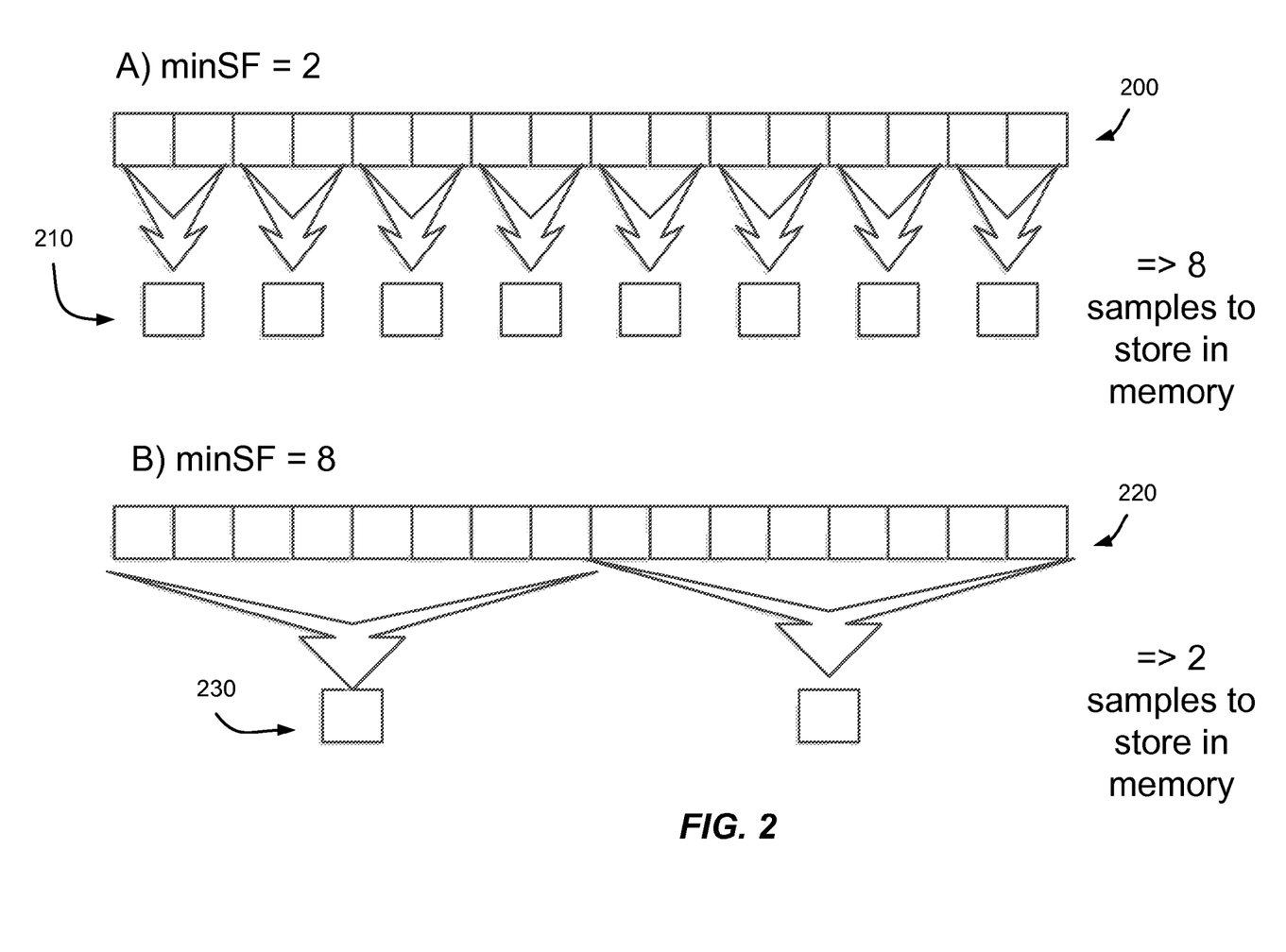
FIG. 2 is a block diagram that illustrates examples of partial despreading.

FIG. 2 illustrates the above described relationship between the minimum SF and the number of accumulated signal samples that has to be stored in the memory of the BS 100. As shown, for a minimum SF of 2, the number of signal samples 210 from the received signal 200 that have to be stored by the memory 150 of the BS 100 is 8. In contrast, when the minimum SF is increased to 8, the number of minimum samples 230 (of the same size) from the received signal 220 that have to be stored by BS 100 decreases to 2. This is a significant decrease in memory usage by the BS 100.

The minimum SF is a Radio Resource Control (RRC) information element (IE), E-DPDCHMaxChannelisation-Codes, that is signaled to the UE and it takes a value from the set {sf256, sf128, sf64, sf32, sf16, sf8, sf4, sf4×2, sf2×2, sf4×2-and-sf2×2}. If the memory 150 of the BS 100's modem chip is large enough to allow all UEs in the system to use the minimum SF (e.g., sf4×2-and-sf2×2), all UEs can potentially achieve the max data rate by each having a dedicated memory space in BS 100 to store the largest number of samples. However, due to bus speed requirements for sample processing, the samples should be stored in internal memory of a chip that is costly in ASIC. Moreover, the total required memory size in BS 100 increases with the number UEs in the system. One way to avoid excessive memory size is to use a large minimum SF, e.g., SF of 256, which effectively reduces the total number of accumulated samples, but this may limit the maximum data rate a UE can exercise. On the other hand, when a high data rate is needed, the UE should go through reconfiguration procedures to use a smaller minimum SF, e.g., sf4×2-and-sf2×2. However, a typical reconfiguration procedure is costly because it takes a long tune, during which no data transfer is possible between the BS 100 and the UE.

The mechanisms proposed herein overcome the above-identified deficiencies for UNITS systems that use 3G High Speed Uplink Packet Access (HSUPA) technology. Particularly, BS 100 that supports HSUPA may use grant messages to specify a minimum SF that UEs should use for spreading of signals transmitted to the BS 100. Generally, grant messages are transmitted on an Enhanced Absolute Grant Channel (E-AGCH) carry serving grants that specifies the maximum traffic to pilot (T2P) power ratio a UE can use. T2P power ratio may be computed by the BS 100 as a ratio of data channel (E-DPDCH) power to control channel (DPCCH) power. In one aspect, the BS 100 may establish a one-to-one mapping between a T2P power ratio and maximum data rate UE can use which in turn can uniquely determine the largest minimum SF that UE can use. Hence, instead of going through costly and time consuming reconfiguration procedures to explicitly change the minimum SF using the UE, a BS can send a serving grant can be used to implicitly specify the minimum SF (virtual minimum SF) that UE has to use. Since the grant is sent by the BS 100, the BS already has the information about the virtual minimum SF, and this information can be used to efficiently use BS's memory resource to store minimum SF accumulated samples, which leads to a reduced memory requirement that, in turn, allows more HSUPA calls in the system.

Figure 3:
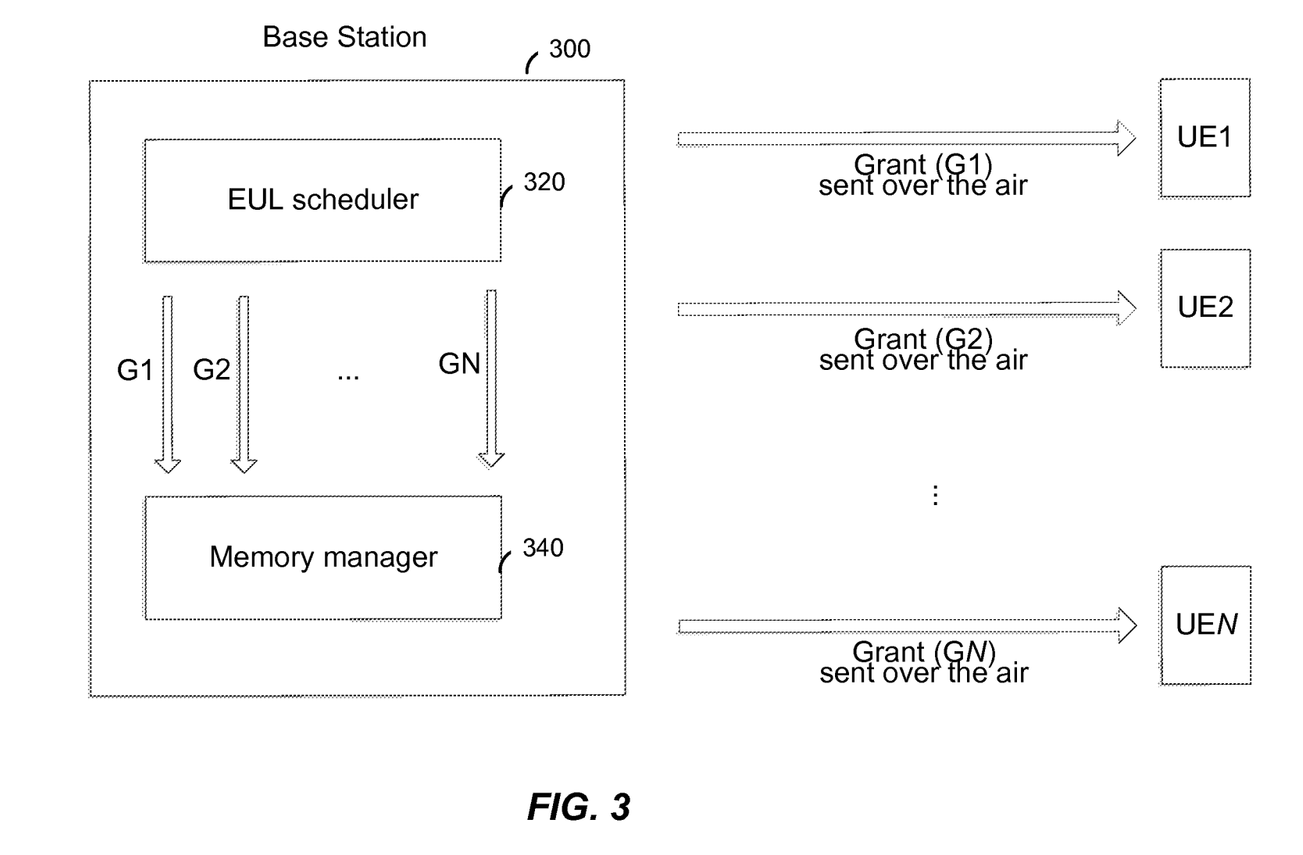
FIG. 3 is a block diagram that illustrates one example implementation of a virtual minimum SF assignment using grant procedure.

FIG. 3 illustrates an example embodiment of a base station configured to implement the above-described virtual minimum SF assignment procedure. Particularly, the BS 300, which may be BS 100 (FIG. 1), may have an Enhanced Uplink (EUL) scheduler 320 that computes grants to be send to each UE (for example, UE1, UE2, ... UEN). The grant value for a UE may be proportional to a T2P power ratio for that UE, which may be computed as a ratio of the data channel power to the control channel power for that UE. The BS 300 may also include a memory manager 340 that sets memory usage for each UE based on the grant value. Particularly, for example, to determine the necessary memory based on particular grant value, the memory manger 340 may maintain a look-up table that provides correlation between grant value (i.e., T2P power ratio), an associated maximum data rate, and an associated minimum SF.

Figure 4:
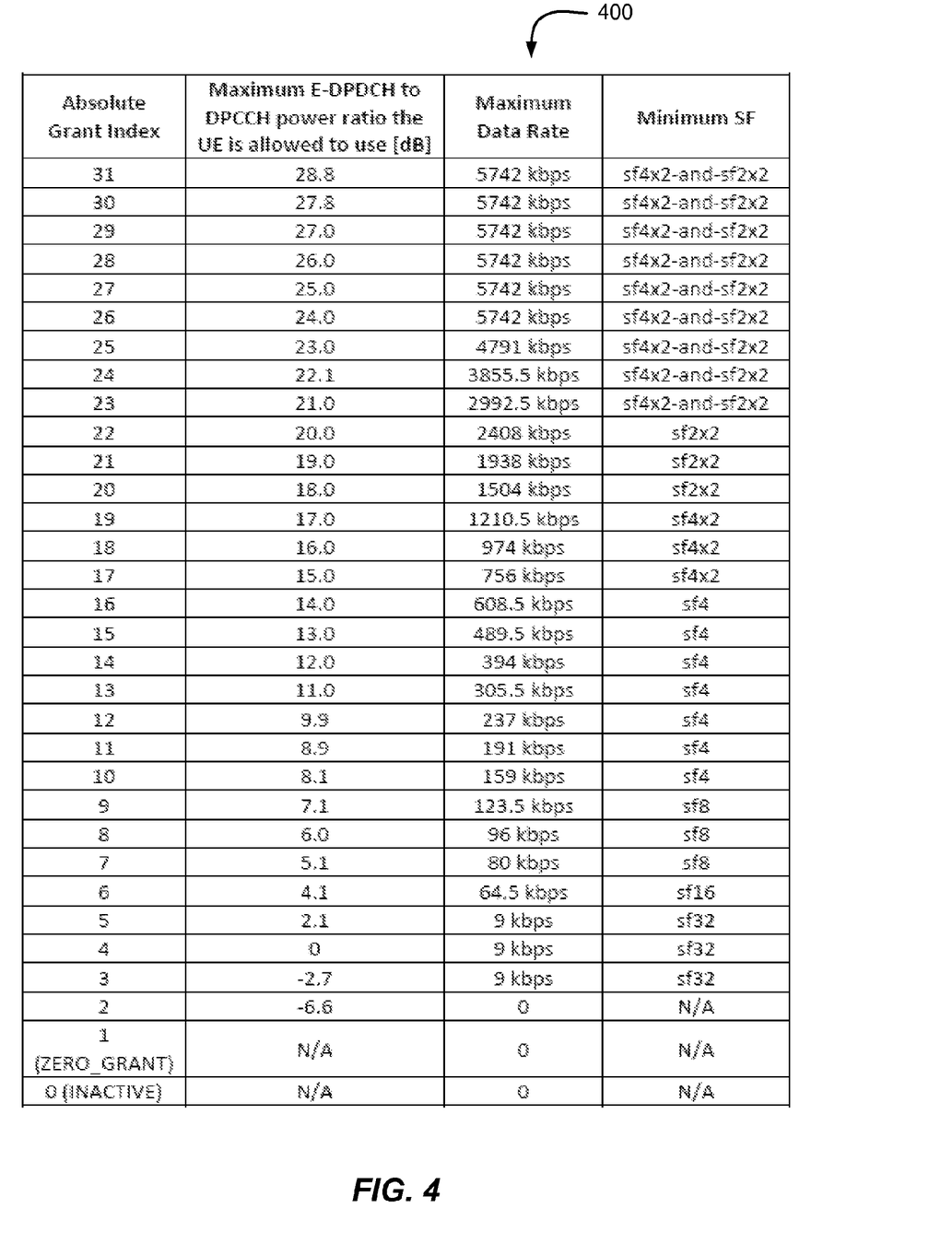
FIG. 4 is an example look-up table illustrating a relationship between the grant and minimum SF.

FIG. 4 shows an example of such table 400. Knowing the minimum SF assigned to each UE, the memory manager 340 may allocate an appropriate amount of memory, such as memory 150 (FIG. 1) to store partially despread signal samples for each UE before the actual SF information is receive from the UE. The BS 100 may then send over the air grant messages to the respective UEs with assigned grant values. The UEs may use a look-up table similar to the table 400 in FIG. 4 to determine the largest minimum SF that it can use for UL transmissions based on the grant value specified in the grant received from the BS 100.

Figure 5A:
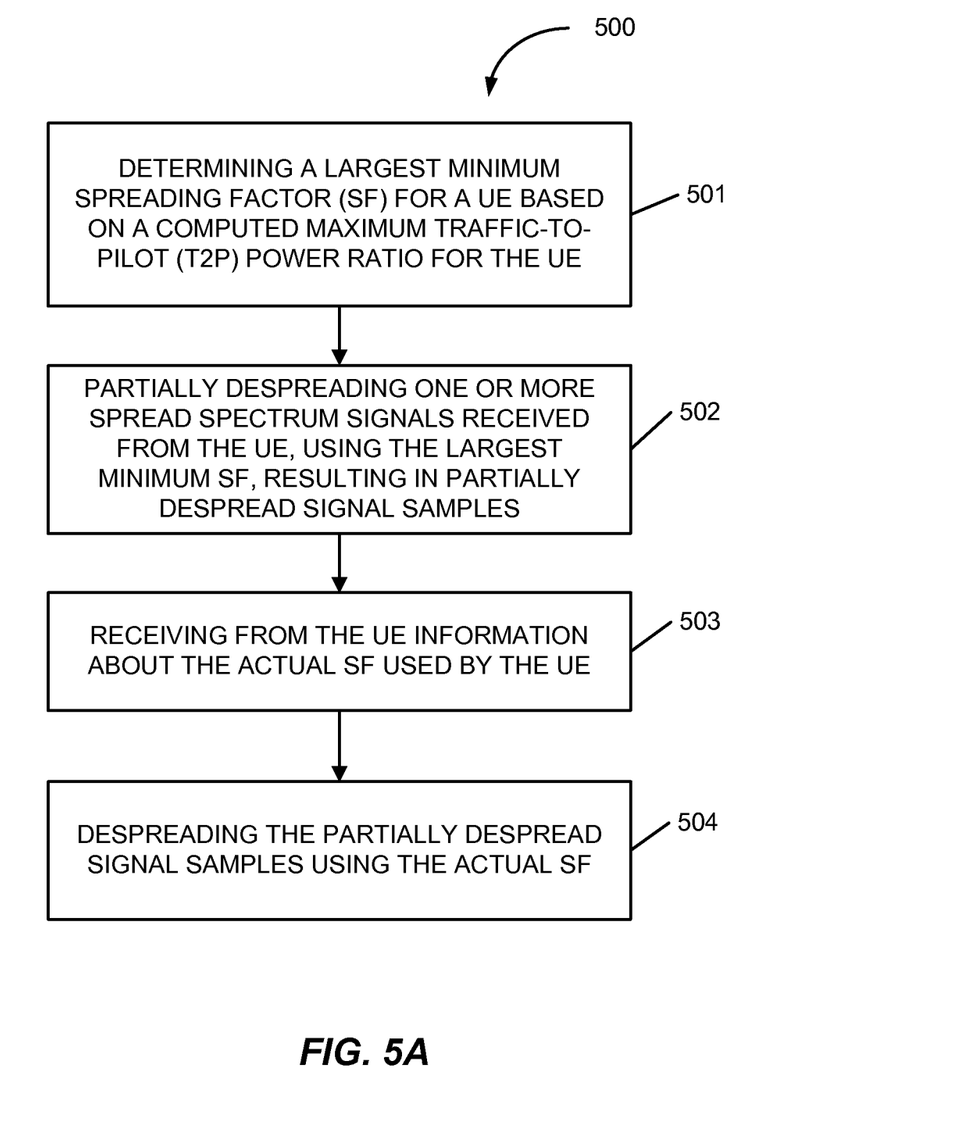
FIGS. 5A-B are flow charts that illustrating examples of methods for allocating memory resources based on a virtual minimum SF assignment procedure.

FIG. 5A is a flow diagram summarizing aspects of a method 500 for wireless communication by a base station (e.g., BS 100) including allocating BS memory resources based on a virtual minimum SF assignment procedure. The method 500 may include, at 501, determining a largest minimum SF for a UE based on a computed maximum T2P power ratio for the UE. In a related aspect, a BS (e.g., BS 100 FIG. 1) may include means for determining a largest minimum SF for a UE based on a computed maximum T2P power ratio for the UE. Said means 100 may include a processor 140 configured to operate an algorithm stored as program instructions in a computer memory 150. The algorithm may include a sequence or arrangement of operations, for example: computing the T2P power ratio as a ratio of data channel (e.g., E-DPDCH) power to control channel (e.g., DPCCH) power; determining a maximum data rate the UE can use based on a data table or other one-to-one mapping between a T2P power ratio and the maximum data rate; and determining the largest minimum SF based on another data table or one-to-one mapping between the maximum data rate and the largest minimum SF. In an alternative, the algorithm may include, for example: computing the T2P power ratio as a ratio of data channel (e.g., E-DPDCH) power to control channel (e.g., DPCCH) power; and determining the largest minimum SF based on a data table or one-to-one mapping between the T2P power ratio and the largest minimum SF.

The method 500 may further include, at 502, partially despreading one or more spread spectrum signals received from the UE, using the largest minimum SF, resulting in partially despread signal samples. In a related aspect, a BS may include means for partially despreading one or more spread spectrum signals received from the UE, using the largest minimum SF, resulting in partially despread signal samples. Said means 100 may include a processor 140 configured to operate an algorithm stored as program instructions in a computer memory 150. The algorithm may include a sequence or arrangement of operations, for example, despreading the signal according to a defined signal spreading technology (e.g., Walsh coding, Hadamard coding, or orthogonal variable spreading factor (OVSF) coding), thereby obtaining a partially despread signal result, and storing the result in a computer memory.

The method 500 may further include, at 503, receiving from the UE information about the actual SF used by the UE. In a related aspect, a BS may include means for receiving from the UE information about the actual SF used by the UE. Said means 100 may include a processor 140 configured to operate an algorithm stored as program instructions in a computer memory 150. The algorithm may include a sequence or arrangement of operations, for example: receiving a control signal from the UE over a control channel, and decoding a value indicating the actual SF used by the UE from the control signal.

The method 500 may further include, at despreading the partially despread signal samples using the actual SF. In a related aspect, a BS may include means for despreading the partially despread signal samples using the actual SF. Said means 100 may include a processor 140 configured to operate an algorithm stored as program instructions in a computer memory 150. The algorithm may include a sequence or arrangement of operations, for example: retrieving the partially despread signal result from the memory, and despreading the partially despread signal result according to a defined signal spreading technology (e.g., Walsh coding, Hadamard coding, or orthogonal variable spreading factor (OVSF) coding), thereby obtaining a completely despread signal result. The method 500 may include additional aspects or operations, for example, operations or aspects similar to those described below in connection with FIG. 5B.

Figure 5B:
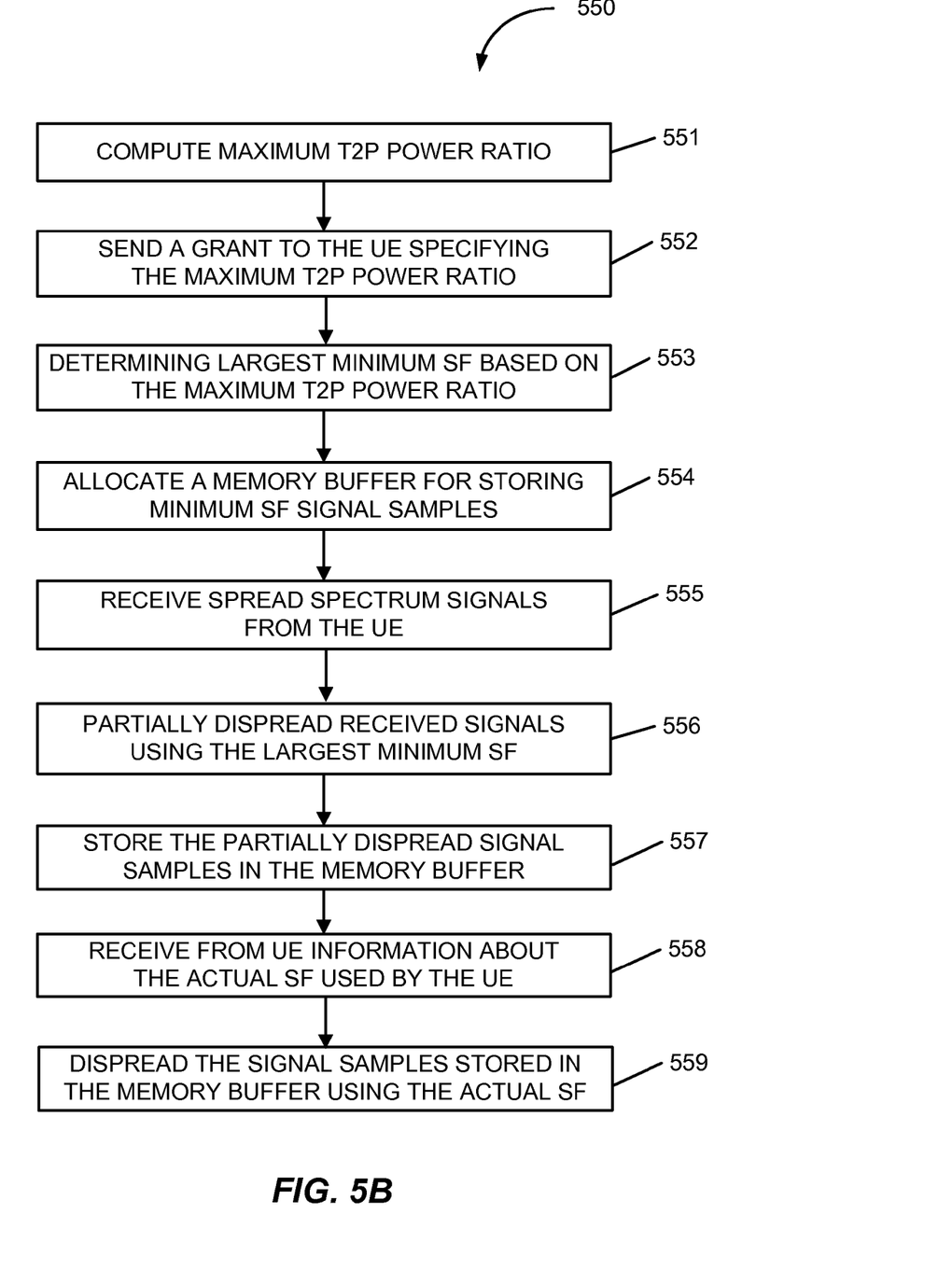

FIG. 5B is a flow diagram showing another example of a related method 550 including allocating BS memory resources based on virtual minimum SF assignment procedure, showing more detailed or optional operations than FIG. 5A. The method 550 may be implemented in a base station, such as BS 300 (FIG. 3). At 551, the BS computes maximum traffic-to-pilot (T2P) power ratio for a UE. At 552, the BS sends a grant message to the UE specifying the maximum T2P power ratio. At 553, the BS determines largest minimum SF for the UE based on the computed maximum T2P power ratio. At 554, the BS allocates a memory buffer for storing minimum SF signal samples. At 555, the BS receives one or more spread spectrum signals from the UE. At 556, the BS partially despreads the received signals using the largest minimum SF. At 557, the BS stores the partially despread signal samples in the memory buffer. At 558, the BS receives from the UE information about the actual SF used by the UE. At 559, the BS despreads the signal samples stored in the memory buffer using the actual SF.

Figure 6:
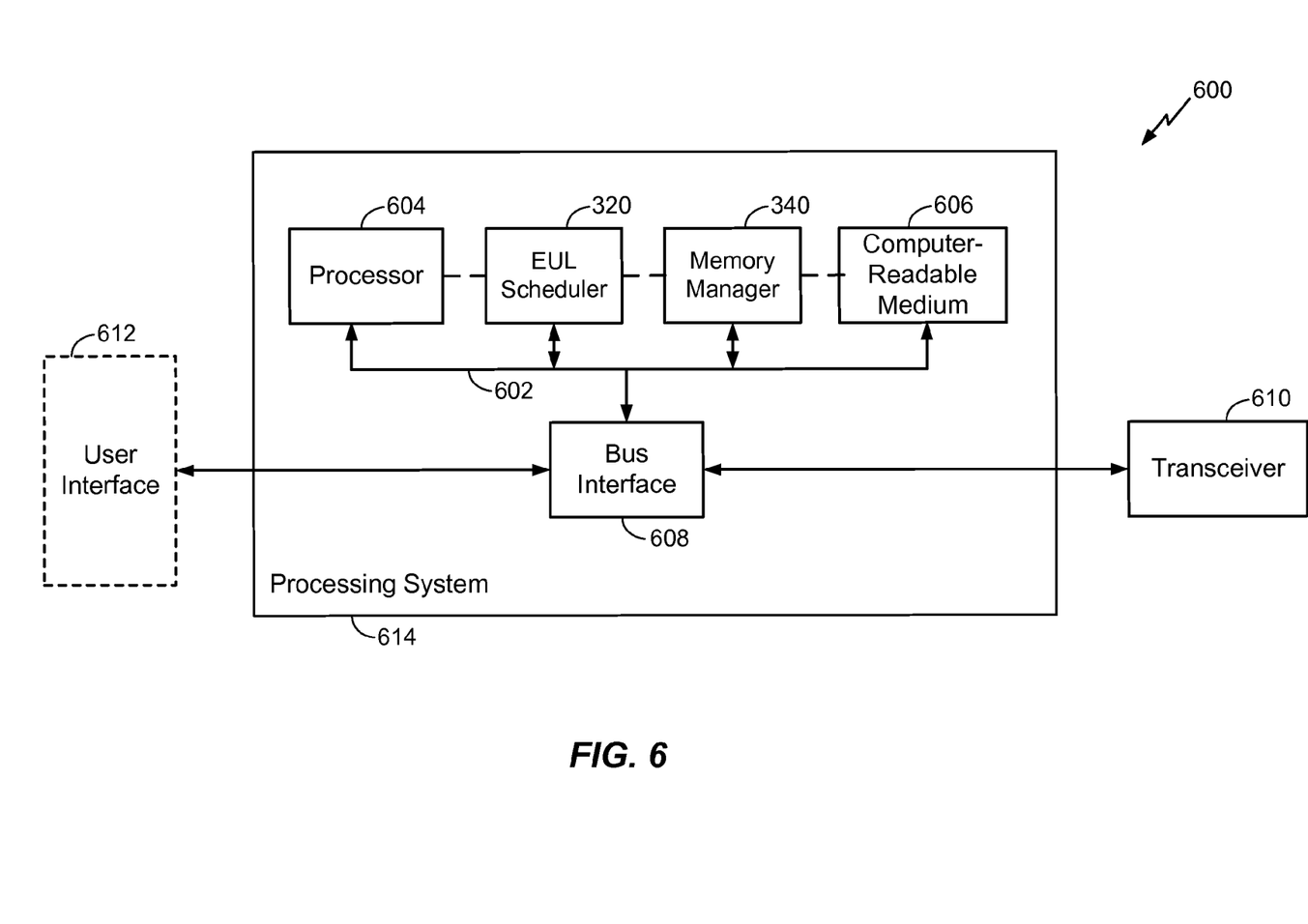
FIG. 6 is a block diagram illustrating an example of a hardware implementation for an apparatus employing a processing system configured to determine partial despreading.

FIG. 6 is a block diagram illustrating an example of a hardware implementation for an apparatus 600, employing a processing system 614. Apparatus 600, which may be BS 300 (FIG. 3), employing a processor system 614 that includes the EUL schedule 320 and memory manager 340 described herein. In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, and computer-readable media, represented generally by the computer-readable medium 606. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

The various concepts presented throughout this disclosure may be implemented across a broad variety of telecommunication systems, network architectures, and communication standards. By way of example and without limitation, the aspects of the present disclosure may be implemented by the BS illustrated in FIG. 7, which is presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 may be an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Figure 7:
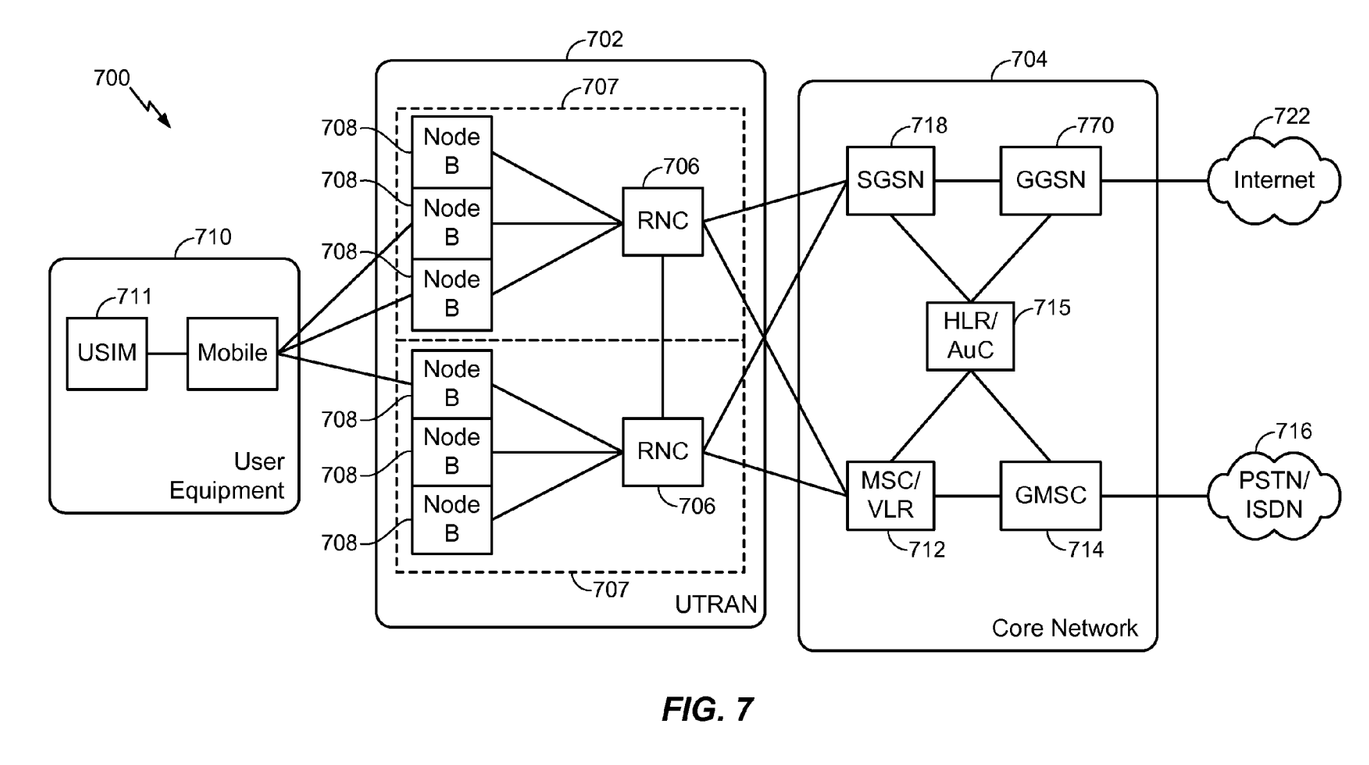
FIG. 7 is a block diagram conceptually illustrating an example of a telecommunications system including an aspect of the base station configured to allocate memory resources based on a virtual minimum SF assignment procedure.

Communication between a UE 710 and a Node B 708, which may be BS 300 in FIG. 3, may be considered as including a physical (PHY) layer and a medium access control (MAC) layer. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The down link (DL), also called the forward link, refers to the communication link from a Node B 708 to a UE 710, and the UL, also called the reverse link, refers to the communication link from a UE 710 to a Node B 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714.

In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 770. GPRS, which stands for General Packet Radio Service, is designed to provide packet-data services at speeds higher than those available with standard circuit-switched data services. The GGSN 270 provides a connection for the UTRAN 702 to a packet-based network 722. The packet-based network 722 may be the Internet, a private data network, or some other suitable packet-based network. The primary function of the GGSN 270 is to provide the UEs 710 with packet-based network connectivity. Data packets may be transferred between the GGSN 270 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the node B 708 over the HS-DPCCH to indicate whether it correctly decoded a packet on the downlink.

HS-DPCCH further includes feedback signaling from the UE 710 to assist the node B 708 in taking the right decision in terms of modulation and coding scheme and preceding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 708 and/or the UE 710 may have multiple antennas supporting MIMO technology. The use of MIMO technology enables the node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
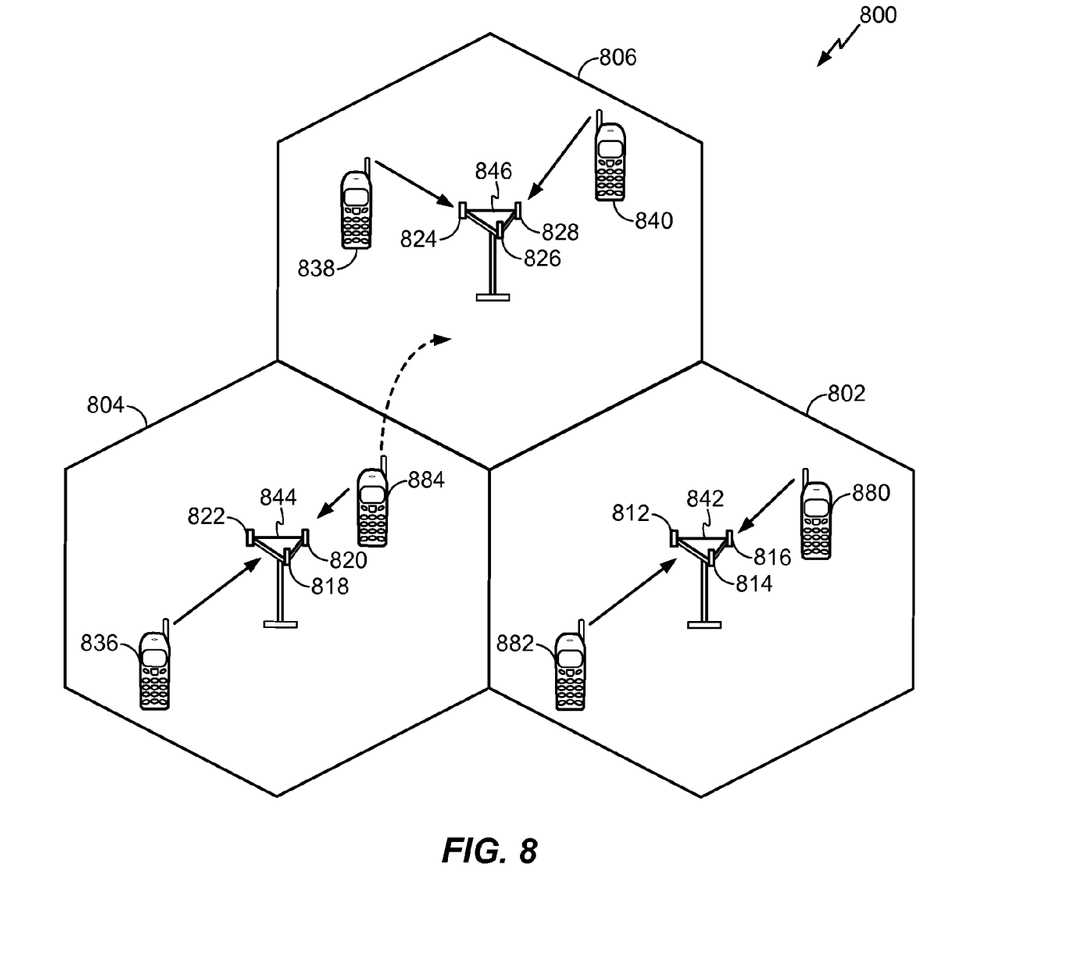
FIG. 8 is a conceptual diagram illustrating an example of an access network including a base station configured to allocate memory resources based on a virtual minimum SF assignment procedure.

Referring to FIG. 8, an access network 800 in a UTRAN architecture is illustrated, including one or more UEs. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector.

In cell 804, antenna groups 818, 370, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 380 and 382 may be in communication with Node B 842, UEs 884 and 836 may be in communication with Node B 844, and UEs 838 and 840 can be in communication with Node B 846. Here, each Node B 842, 844, 846 is configured to provide an access point to a CN 704 (see FIG. 7) for all the UEs 884, 836, 838, 840 in the respective cells 802, 804, and 806. Further, one or more of Node Bs 842, 844, 846 may be the same as or similar to BS 800 (FIG. 3).

As the UE 884 moves from the illustrated location in cell 804 into cell 806, a serving cell change (SCC) or handover may occur in which communication with the UE 884 transitions from the cell 804, which may be referred to as the source cell, to cell 806, which may be referred to as the target cell. Management of the handover procedure may take place at the UE 884, at the Node Bs corresponding to the respective cells, at a radio network controller 706 (see FIG. 7), or at another suitable node in the wireless network. For example, during a call with the source cell 804, or at any other time, the UE 884 may monitor various parameters of the source cell 804 as well as various parameters of neighboring cells such as cells 806 and 802. Further, depending on the quality of these parameters, the UE 884 may maintain communication with one or more of the neighboring cells. During this time, the UE 884 may maintain an Active Set, that is, a list of cells that the UE 884 is simultaneously connected to (i.e., the UTRA cells that are currently assigning a downlink dedicated physical channel DPCH or fractional downlink dedicated physical channel F-DPCH to the UE 884 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA7000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.70, and Flash-OFDM employing OFDMA. UTRA, E-UTRA, UMTS, LTE, LTE Advanced, and GSM are described in documents from the 3GPP organization. CDMA7000 and UMB are described in documents from the 3GPP2 organization. The actual wireless communication standard and the multiple access technology employed will depend on the specific application and the overall design constraints imposed on the system.

Figure 9:
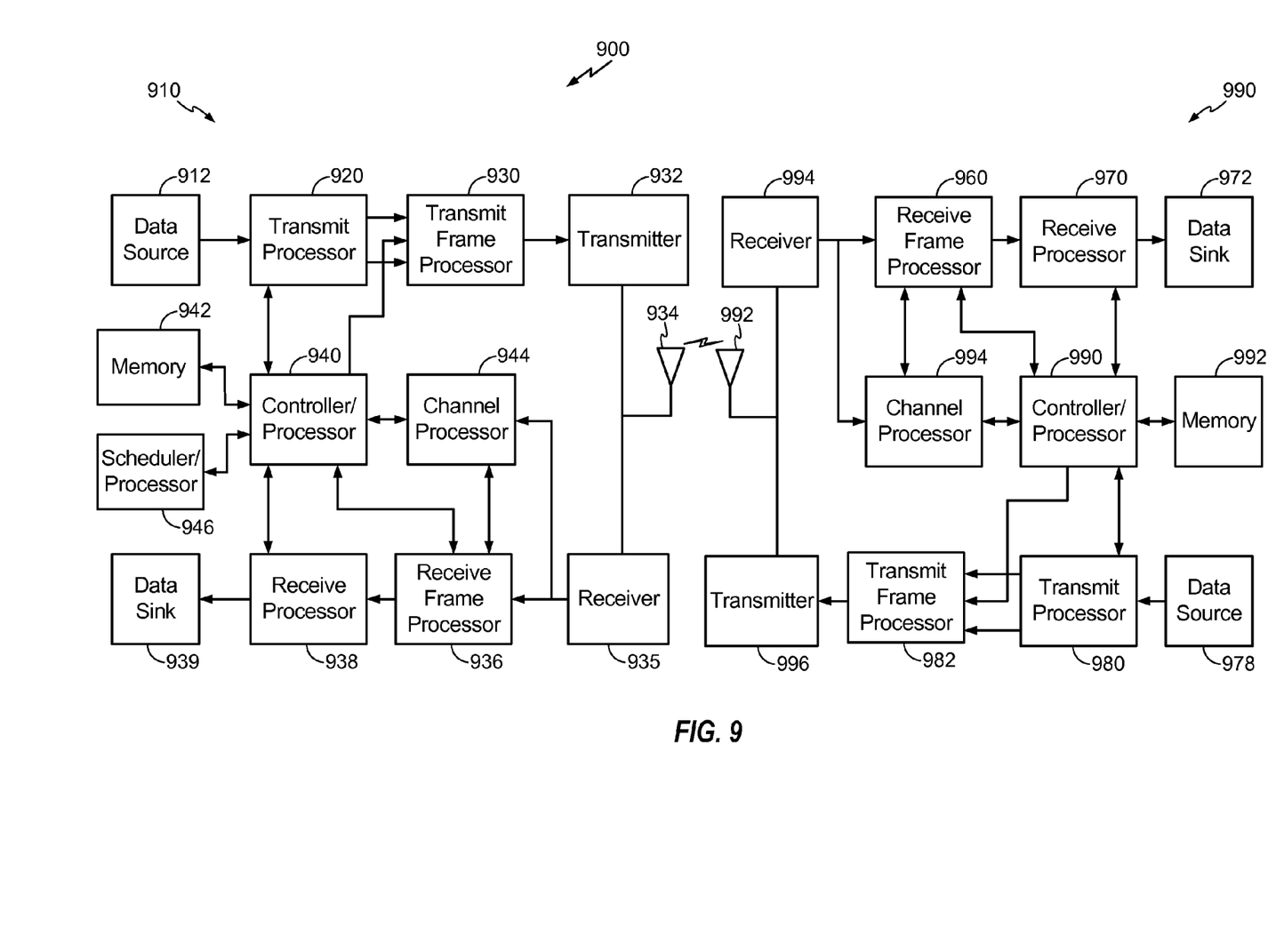
FIG. 9 is a block diagram conceptually illustrating an example of a Node B in communication with a UE in a telecommunications system, wherein the Node B configured to allocate memory resources based on a virtual minimum SF assignment procedure.

FIG. 9 is a block diagram of a Node B 910 in communication with a UE 950, where the Node B 910 may be the BS 300 in FIG. 3. In the downlink communication, a transmit processor 970 may receive data from a data source 912 and control signals from a controller/processor 940. The transmit processor 970 provides various signal processing functions for the data and control signals, as well as reference signals (e.g., pilot signals). For example, the transmit processor 970 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shill keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 970. These channel estimates may be derived from a reference signal transmitted by the UE 950 or from feedback from the UE 950. The symbols generated by the transmit processor 970 are provided to a transmit frame processor 980 to create a frame structure. The transmit frame processor 980 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 970 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the midamble transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively, if some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. The computer readable media of memories 942 and 992 may store data and software for the Node B 910 and the UE 950, respectively. A scheduler/processor 946 at the Node B 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA7000, Evolution-Data Optimized (EV-DO), Ultra Mobile Broadband (UMB), IEEE 802.11 (Wi-Fi), IEEE 802.16 (WiMAX), IEEE 802.70, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, such as a custom application-specific integrated circuit (ASIC), and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be implemented in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is for purpose of example, and not for limitation. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication comprising:
    determining a largest minimum spreading factor (SF) for a user equipment (UE) based on a maximum traffic-to-pilot (T2P) power ratio for the UE;
    partially despreading one or more spread spectrum signals received from the UE, using the largest minimum SF, resulting in partially despread signal samples;
    receiving from the UE information about the actual SF used by the UE; and
    despreading the partially despread signal samples using the actual SF.

2. The method of claim 1, further comprising computing the maximum T2P power ratio for the UE.

3. The method of claim 1, further comprising sending a grant message to the UE specifying the maximum T2P power ratio.

4. The method of claim 1, further comprising allocating a memory buffer for storing minimum SF signal samples.

5. The method of claim 1, further comprising receiving the one or more spread spectrum signals from the UE.

6. The method of claim 1, further comprising storing the partially despread signal samples in a memory buffer.

7. The method of claim 1, wherein determining the largest minimum SF for the UE based on the maximum T2P power ratio comprises:
    determining a maximum data rate associated with the maximum T2P power ratio;
    determining the largest minimum SF associated with the maximum data rate.

8. The method of claim 7, wherein determining largest minimum SF for the UE based on the maximum T2P power ratio comprises using a look-up table that specifies corresponding maximum T2P power ratio, maximum data rate, and minimum SF.

9. The method of claim 1, wherein a T2P power ratio is a ratio of Enhanced Dedicated Physical Control Channel (E-DPCCH) power to Dedicated Physical Control Channel (DPCCH) power.

10. The method of claim 1, wherein the spread spectrum signals are spread using Orthogonal Variable Spreading Factor (OVSF) codes.

11. An apparatus for wireless communication, comprising a memory coupled to at least one processor, the memory holding instructions that when executed by the at least one processor, cause the apparatus to:
    determine a largest minimum spreading factor (SF) for a user equipment (UE) based on a maximum traffic-to-pilot (T2P) power ratio for the UE;
    partially despread one or more spread spectrum signals received from the UE, using the largest minimum SF, resulting in partially despread signal samples;
    receive from the UE information about the actual SF used by the UE; and
    despread the partially despread signal samples using the actual SF.

12. The apparatus of claim 11, wherein the memory holds further instructions for computing the maximum T2P power ratio for the UE.

13. The apparatus of claim 11, wherein the memory holds further instructions for sending a grant message to the UE specifying the maximum T2P power ratio.

14. The apparatus of claim 11, wherein the memory holds further instructions for allocating a memory buffer for storing minimum SF signal samples.

15. The apparatus of claim 11, wherein the memory holds further instructions for receiving the one or more spread spectrum signals from the UE.

16. The apparatus of claim 11, wherein the memory holds further instructions for storing the partially despread signal samples in a memory buffer.

17. The apparatus of claim 11, wherein the memory holds further instructions for determining a largest minimum SF for the UE based on the maximum T2P power ratio at least in part by:
    determining a maximum data rate associated with the maximum T2P power ratio;
    determining the largest minimum SF associated with the maximum data rate.

18. The apparatus of claim 17, wherein the memory holds further instructions for determining the largest minimum SF for the UE based on the maximum T2P power ratio at least in part by using a look-up table that specifies corresponding maximum T2P power ratio, maximum data rate, and minimum SF.

19. The apparatus of claim 11, wherein the memory holds further instructions for determining a T2P power ratio based on a ratio of Enhanced Dedicated Physical Control Channel (E-DPCCH) power to Dedicated Physical Control Channel (DPCCH) power.

20. The apparatus of claim 11, wherein the memory holds further instructions for receiving the spread spectrum signals spread using Orthogonal Variable Spreading Factor (OVSF) codes.

21. A non-transitory computer-readable medium holding instructions that when executed by at least one processor, cause a computer to:
    determine a largest minimum spreading factor (SF) for a user equipment (UE) based on a maximum traffic-to-pilot (T2P) power ratio for the UE;
    partially despread one or more spread spectrum signals received from the UE, using the largest minimum SF, resulting in partially despread signal samples;
    receive from the UE information about the actual SF used by the UE; and
    despread the partially despread signal samples using the actual SF.

22. An apparatus for wireless communication comprising:
    means for determining largest minimum spreading factor (SF) for a user equipment (UE) based on a maximum traffic-to-pilot (T2P) power ratio for the UE;
    means for partially despreading one or more spread spectrum signals received from the UE, using the largest minimum SF, resulting in partially despread signal samples;
    means for receiving from the UE information about the actual SF used by the UE; and
    means for despreading the partially despread signal samples using the actual SF.

* * * * *